May 10, 1932.  C. G. MIKKELSEN  1,857,858
POULTRY FEEDER
Filed Feb. 10, 1931
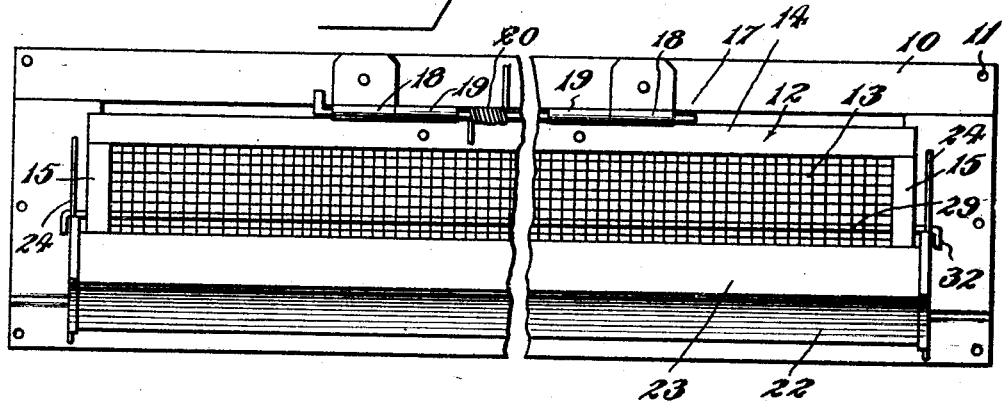
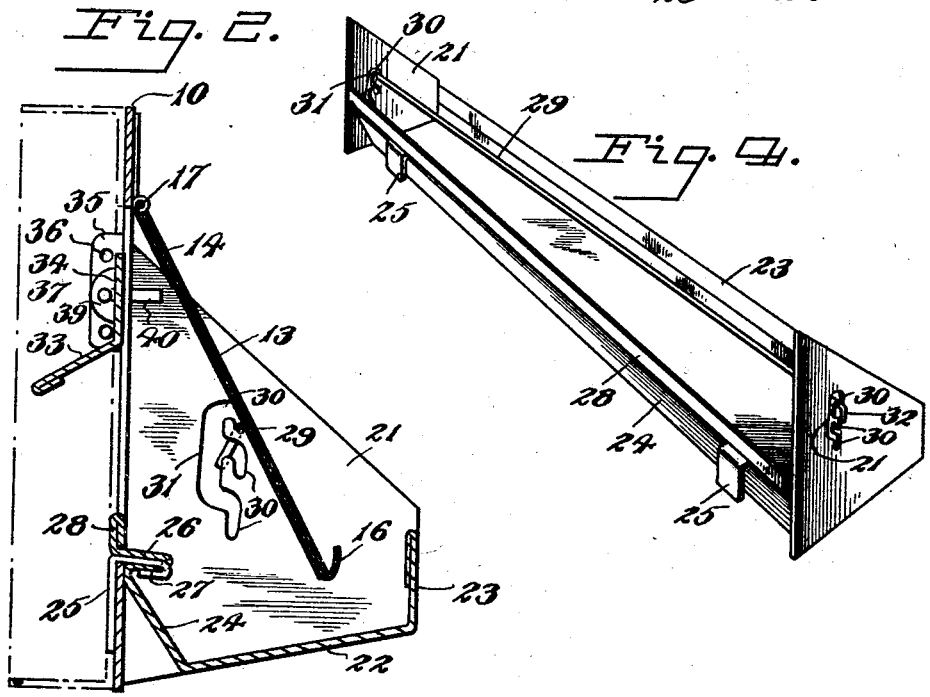
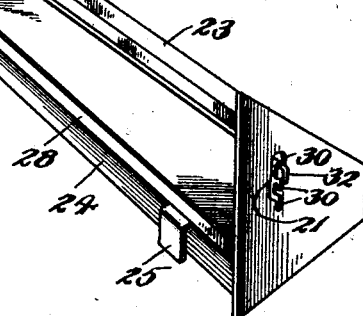
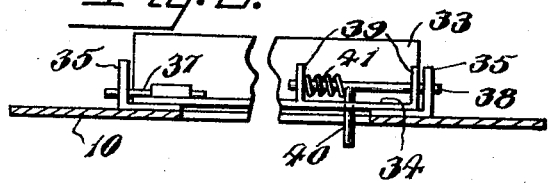
Inventor
C. G. Mikkelsen
By Lacey & Lacey
Attorneys Patented May 10, 1932

1,857,858

UNITED STATES PATENT OFFICE

CARL G. MIKKELSEN, OF HILLIARD, FLORIDA

POULTRY FEEDER

Application filed February 10, 1931. Serial No. 514,821.

This invention relates to poultry feeders.

In poultry raising, it is customary to brood chicks in battery brooders built in units consisting of from 4 to 6 drawers having removable wire floors and slide clean-out trays, together with feed and water troughs for the drawers, the latter being placed outside and being accessible to the chicks through feed openings, and to the operator through a door for replenishing the food and water supply. There is considerable waste feed from the chicks billing out the feed, as well as considerable loss of chicks because of vent pickings and getting injured from being caught in the feed openings in these troughs.

The present invention provides a poultry feeder or trough adapted to eliminate waste of food, loss of chicks from injury and vent pickings, as well as providing a feed trough which is easily removable, is adjustable to provide a suitable feed opening for chicks of various ages, and which will give unobstructed view of the chicks at all times as well as prevent pollution of the feed from droppings.

With the above and other objects in view the invention consists in certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification:

Figure 1 is a front elevation of a poultry feeder embodying my improvements,

Fig. 2 is an enlarged vertical sectional view through the feeder,

Fig. 3 is a detail cross sectional view showing the adjustable feed opening droppings guard flange in plan, and Fig. 4 is a detail perspective view of the trough viewed from the feeding side thereof.

Referring now to the drawings in which like characters of reference designate similar parts in the various views, the feeder is shown to comprise a frame 10 which is preferably rectangular in outline and formed of sheet metal, there being a plurality of openings 11 formed near the edges of the frame through which nails, screws or like securing devices may be passed to secure the frame to the battery unit.

A door 12 is hinged at the top to the frame, the door preferably being formed of wire mesh 13 secured in any preferred manner to a longitudinal strip 14 and end strips 15 of sheet metal. The lower edge of the netting is bent forwardly and upwardly to provide a grip 16 for manipulating the door. Preferably, the door is hinged in position by means of a pintle 17 passed through hinge eyes 18 carried by the frame 10, and similar hinge eyes 19 carried by the longitudinal strip 14. A spring 20 surrounds the pintle and is terminally bent to engage the frame and the strip to normally hold the door closed.

By referring more particularly to Figs. 2 and 4, it will be seen that the feed trough comprises end walls 21 of sufficient height to extend from the bottom of the frame to the top of the door. An upwardly inclined bottom 22 connects the end walls. A front wall 23 connects the end walls and is of sufficient height to permit the door passing over it when being opened or closed. The bottom 22 terminates short of the rear edges of the end walls 21 and is provided with an inclined extension 24.

A pair of securing hooks 25 are secured to the extension 24 and are adapted to be hooked over the bottom longitudinal portion of the frame 10 to removably secure the trough to the frame. Preferably, the hooks are secured to the extension 24 by means of a clamp flange 26 bent over the upper inturned ends of the hooks and underneath an inturned flange 27 on the extension 24, as best shown in Fig. 2. Said flange 26 is directed upwardly to provide a flange 28 which extends in the plane of the frame 10. Said flange 26 performs the function of returning food dropped by the chicks back into the trough, and this flange also prevents billing out of the food by the chicks. The flange 28 performs the function of gathering food dropped by the chicks and deflecting it onto the flange 26 to be returned to the trough. Thus waste of feed is reduced to a minimum.

To remove the trough, it is simply necessary to raise the trough until the hooks 25 are freed from the frame. To apply the trough to the frame, it is simply necessary to reverse the movements just described.

The hinged door 13 is held open by a rod 29 to afford sufficient space above the flange 26 to permit the chicks feeding from the trough. To accommodate chicks of various ages, the rod is adjustably secured at the ends in the end walls 21 of the trough by means of a series of preferably three bayonet slots 30 connected at the inner ends by a run slot 31 which permits of the rod being inserted in the top, bottom or intermediate bayonet slot. The ends of the rod are bent downwardly to provide grips 32 for adjusting the rod, these grips being short enough to pass through the run slots 31 and permit removal of the rod so that the door may be closed by its controlling spring 20 when the trough must be removed for any reason.

To prevent the chicks from depositing droppings in the feed trough, a downwardly inclined flange 33 is mounted on the inner face or feeding side of the frame 10. The flange is provided with a vertical portion 34 which overlaps the inner faces of the end strips of the frame 10. A pair of angle iron supports 35 are secured to the ends of the frame in any preferred manner, and these supports are preferably each provided with a vertical series of perforations 36 to selectively receive corresponding pins 37 and 38 carried by the upright portion 34 of the flange 33, and permit of the flange being adjusted vertically to accommodate feeding of chicks of different ages.

By referring more particularly to Fig. 3, it will be seen that the pin 38 is slidably fitted at the ends in perforated lugs 39 carried by the upright portion 34 of the guard flange 33, and is provided with a handle 40 by means of which the pin may be slid against the tension of a spring 41 to clear the adjacent angle iron support 35 and permit adjustment of the guard flange. As shown in Fig. 2, the handle 40 projects through the frame 10 and into the trough near the top thereof so as to be within convenient reach when the door 12 is raised out of the trough.

Preferably, all of the parts of the device are formed of sheet metal so that the device may be easily cleansed and kept in a sanitary condition. It will be particularly pointed out that the flanges 26 and 28 positively prevent billing out of the food from the trough as well as returning dropped food to the trough so that economy is greatly promoted. It will be also pointed out that the guard flange 33 positively prevents the chicks from backing up and depositing droppings in the feed trough so that the sanitary condition of the feed is perfect.

It will also be pointed out that the screen or wire mesh door 12 permits of an unobstructed view of the chicks at all times while adequately confining the chicks against escape.

Vent picking is caused by chicks feeding through holes, thereby obstructing view of feed and presenting vent to other hungry chicks to pick at, thereby starting vent picking and cannibalism; this vice is overcome by the full view of feed the chicks have in the present feeder.

Having thus described the invention, I claim:

1. A poultry feeder for brooders comprising a supporting frame providing a feed opening, a trough carried by the frame, a door hinged at the top to the frame and projecting into said trough, a flange carried by the rear side of the trough and projecting inwardly into the trough to prevent billing out of feed, and an upstanding flange on the trough disposed substantially in the plane of said frame and adapted to deflect food dropped by the chicks onto the first named flange for return to the trough.

2. A poultry feeder for brooders comprising a supporting frame forming a feed opening, a screen door hinged to said frame and spring controlled to normally close said opening, a trough removably secured to the lower longitudinal edge portion of said frame and receiving the free edge of said door, and means for adjustably securing said door at various angular positions in said trough comprising a rod carried by the door selectively engageable in a plurality of communicating vertically disposed bayonet slots in the end walls of the trough.

3. A poultry feeder for brooders comprising a supporting frame forming a feed opening, a downwardly swinging door carried by said frame for closing said opening, a feed trough carried by the frame and receiving the free edge portion of said door, means for holding said door at various angular positions with respect to said trough, an inturned flange carried by said trough and spaced from said door, said flange preventing billing out of food from the trough, and an upstanding flange contiguous with the first named flange and disposed substantially in the plane of said frame for deflecting food dropped by the chicks onto the first named flange for return to the trough.

4. A poultry feeder for brooders comprising a supporting frame forming a feed opening, a trough carried by the frame, a hinged door carried by the frame and extending into the trough, a flange carried by the trough and extending toward said door for preventing billing out of the feed, an upstanding flange carried by the trough substantially in the plane of the frame for deflecting food dropped by the chicks back into the trough, and a guard flange on the opposite face of said frame from said door and adapted to prevent the chicks backing up and depositing droppings in the trough through said feed opening.

5. In a poultry feeder, a supporting frame forming a feed opening, a trough deposited on one side of said frame, a downwardly swinging door carried by the frame and projecting into the trough, a flange disposed on the opposite side of said frame from said door and trough for preventing chicks depositing droppings in said trough through said feed opening, means for adjustably holding the door at various angular positions in said trough, and means for adjustably mounting said flange vertically on said frame, both of said means coacting in permitting the feeding of chicks of various ages.

In testimony whereof I affix my signature.

CARL G. MIKKELSEN. [L. S.]